US007627626B2

(12) United States Patent
Kroening

(10) Patent No.: US 7,627,626 B2
(45) Date of Patent: Dec. 1, 2009

(54) SYSTEM FOR RESTRICTING USE OF A GRID COMPUTER BY A COMPUTING GRID

(75) Inventor: James L. Kroening, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 946 days.

(21) Appl. No.: 10/419,475

(22) Filed: Apr. 21, 2003

(65) Prior Publication Data

US 2004/0210627 A1 Oct. 21, 2004

(51) Int. Cl.
*G06F 15/16* (2006.01)
(52) U.S. Cl. .................... 709/201; 709/226; 709/228
(58) Field of Classification Search ................. 709/201, 709/226, 228; 713/182
See application file for complete search history.

(56) References Cited

U.S. PATENT DOCUMENTS

| 5,560,008 A | 9/1996 | Johnson et al. |
| 5,822,521 A | 10/1998 | Gartner et al. |
| 6,463,457 B1 * | 10/2002 | Armentrout et al. ......... 709/201 |
| 6,466,947 B2 * | 10/2002 | Arnold et al. ............ 707/104.1 |
| 2002/0059392 A1 * | 5/2002 | Ellis, III .................... 709/208 |

OTHER PUBLICATIONS

IBM Redbooks Paper Fundamentals of Grid Computing IMB Corp, 2002 (ibm.com/redbooks).
Parabon Computation http://parabon.com/clients/index.jsp Frontier Discovery from Your Desktop.
Parabon Comuputation http://www.parabon.com/clients/internetComputingWhitePaper5.jsp Parabon's Internet Computing Platform: Frontier.
Legion-A Worldwide Virtual Computer-Frequently Asked Questions http://www.cs.virginia.edu/-legion/FAQ.html.

* cited by examiner

*Primary Examiner*—Frantz B Jean
(74) *Attorney, Agent, or Firm*—Pearne & Gordon LLP

(57) ABSTRACT

A system is disclosed for restricting operations of a grid software application performing on a grid computer of the computing grid. The system includes a method that presents a user of the grid computer with an option governing use of the grid computer by computing grid operations performed on the grid computer, accepting from the user a setting of options governing use of the grid computer, and applying the setting of the options governing use of the grid computer to the computing grid operations performed on the grid computer.

23 Claims, 6 Drawing Sheets

SYSTEM FOR RESTRICTING USE OF A GRID COMPUTER BY A COMPUTING GRID

BACKGROUND OF THE INVENTION

1. Field of the Invention

The present invention relates to grid computing systems and more particularly pertains to a system for restricting the use of a grid computer by a grid computing system based upon various user-determined parameters of use and policy filters.

2. Description of the Prior Art

Grid computing, which is sometimes referred to as distributed processing computing, has been proposed and explored as a means for bringing together a large number of computers of wide ranging locations and often disparate types for the purpose of utilizing idle computer processor time and/or unused storage by those needing processing or storage beyond their capabilities. While the development of public networks such as the Internet has facilitated communication between a wide range of computers all over the world, grid computing aims to facilitate not only communication between computers but also to coordination of processing by the computers in a useful manner. Typically, jobs are submitted to a managing entity of the grid system, and the job is executed by one or more of the grid computers making up the computing grid.

However, while the concept of grid computing holds great promise, the execution of the concept has not been without its challenges. One challenge associated with grid computing is operating a grid system while respecting both the interests of the customers submitting jobs to the grid system and the interests of the users or owners of the computers of the computing grid system.

Much of the early development of grid computing occurred in research institutions, and many initial implementations of grid computing systems involved eleemosynary purposes such as advancing research in detecting signs of intelligent life in outer space, mapping the human genome, simulating testing of various cancer drugs, and other charitable causes. Computer users or owners (hereinafter computer users) voluntarily enlisted their computers in a single purpose computing grid system in order to advance these causes, usually without any significant compensation above and beyond the satisfaction that they were participating in this noble work. These single purpose grids have encouraged a relatively large number of computer users to participate, in part because the grids have been formed for a single purpose and the computer user has been aware of the common purpose of all of the jobs submitted to the user's computer.

However, recent trends in the development of grid computing are directed to applying grid computing concepts to commercial applications. Grid customers with computing projects that have significant amount of data processing and/or data storage requirements may utilize a commercial computing grid system for these projects, and the computing grid system may receive some type of compensation for the use. Potential customers for commercial computing grids may have a wide variety of identities and a wide variety of purposes for using the computing grid. Thus, it may become prohibitive to efficient grid operation to identify each grid customer and the nature of each grid job to the user of each grid computer in order to obtain the user's advance permission prior to requesting the performance of the grid job by the user's computer.

As the purposes of grid computing networks moves away from the more eleemosynary purposes to the more commercial, at least some resistance to participation in the computing grids may be anticipated that could significantly impede the growth of the computing grid. This may be due in part to the reluctance of computer users to turn over their surplus processor time and storage space to a computing grid system for purposes that are not immediately known to them, for purposes that may be undesirable to them, and for the purposes of customers which may be undesirable to the computer user.

Further, greater participation in the grid systems is likely if potential grid participants can be given greater assurance that the performance of grid jobs can be performed on the user's computer in a manner that is unobtrusive as possible so that the primary work of the computer is not significantly negatively affected.

In view of the foregoing, it is believed that there is a need for a system that balances the interests of the customers of the grid system with the interests of the users of the grid computers.

SUMMARY OF THE INVENTION

In view of the different, and potentially conflicting, interests of the grid system customer and the grid computer user, the present invention discloses a system for restricting the use of a grid computer by a grid computing system based upon various user-determined parameters of use and policy filters.

In one aspect of the invention, a method is disclosed for restricting operations of a computing grid performed on a grid computer of the computing grid. The method comprises presenting a user of the grid computer with an option governing use of the grid computer by computing grid operations performed on the grid computer, accepting from the user a setting of the option governing use of the grid computer, and applying the setting of the option governing use of the grid computer to the computing grid operations performed on the grid computer.

In another aspect of the invention, the method of the invention is implemented by a program of instructions in a computer readable medium.

In a further aspect of the invention, a system is disclosed for restricting operations of a computing grid performed on a grid computer of the computing grid. The system comprises means for presenting a user of the grid computer with an option governing use of the grid computer by computing grid operations performed on the grid computer, means for accepting from the user a setting of the option governing use of the grid computer, and means for applying the setting of the option governing use of the grid computer to the computing grid operations performed on the grid computer.

In one implementation of the invention, the restrictions are performed at the grid computer based upon the user's preferences.

A significant advantage of the invention is that, by providing the operating and filtering options of the invention to the user of a computer, the participation by computer users in a computing grid system is likely to increase, especially if the user of the grid computer feels that he or she retains some basic control over the usage of the grid computer even during the performance of computing grid operations on the computer. The ability to limit the intrusiveness of the grid operations on the grid computer, and the knowledge of the user as to the restrictions as to what the grid computer may (or may not) be used for, may encourage users to join computing grid systems.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred implementations of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
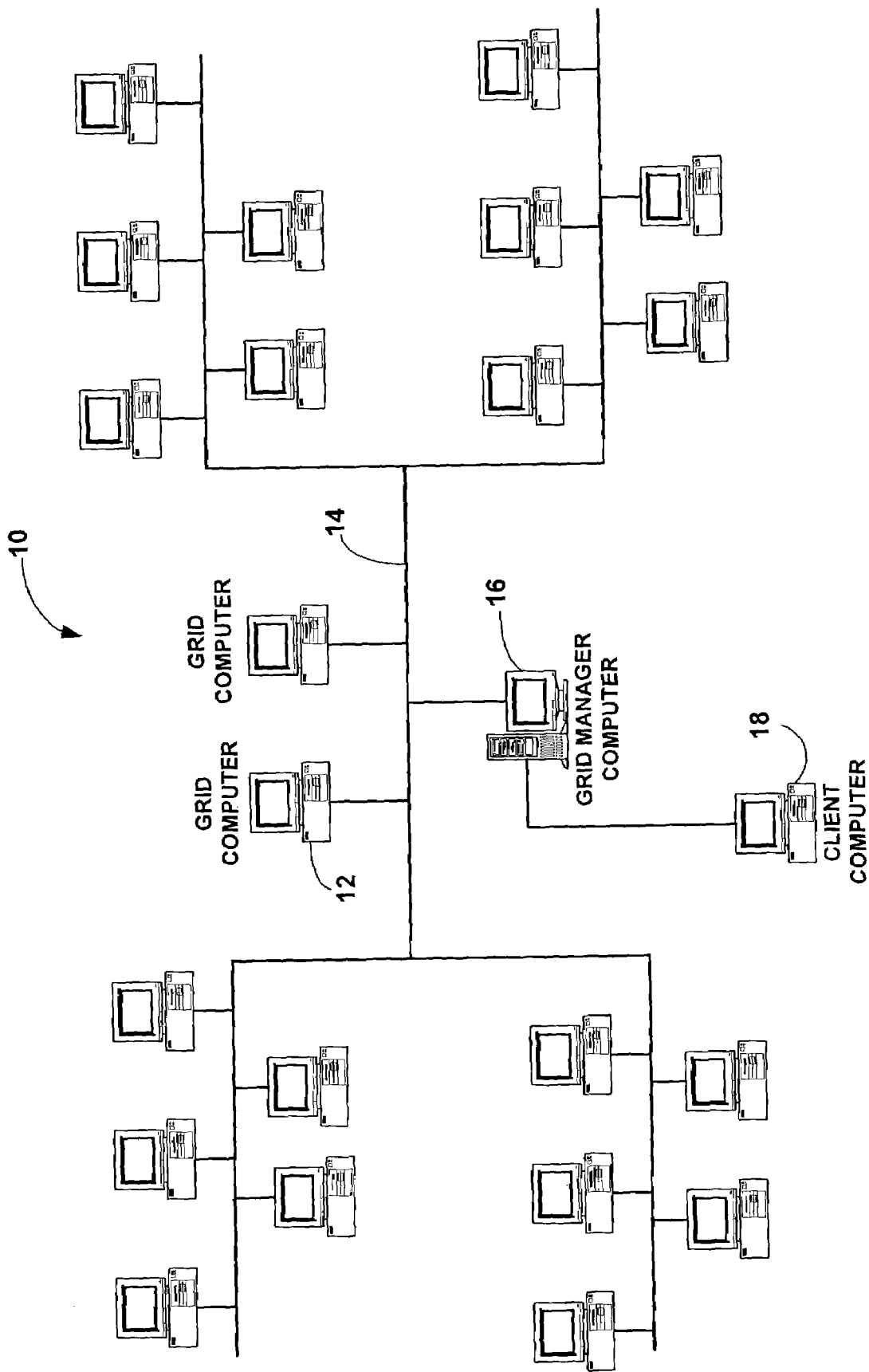
FIG. 1 is a schematic diagram of a computing grid system suitable for implementing the system of the present invention for restricting use of a grid computer by a computing grid.
Figure 2:
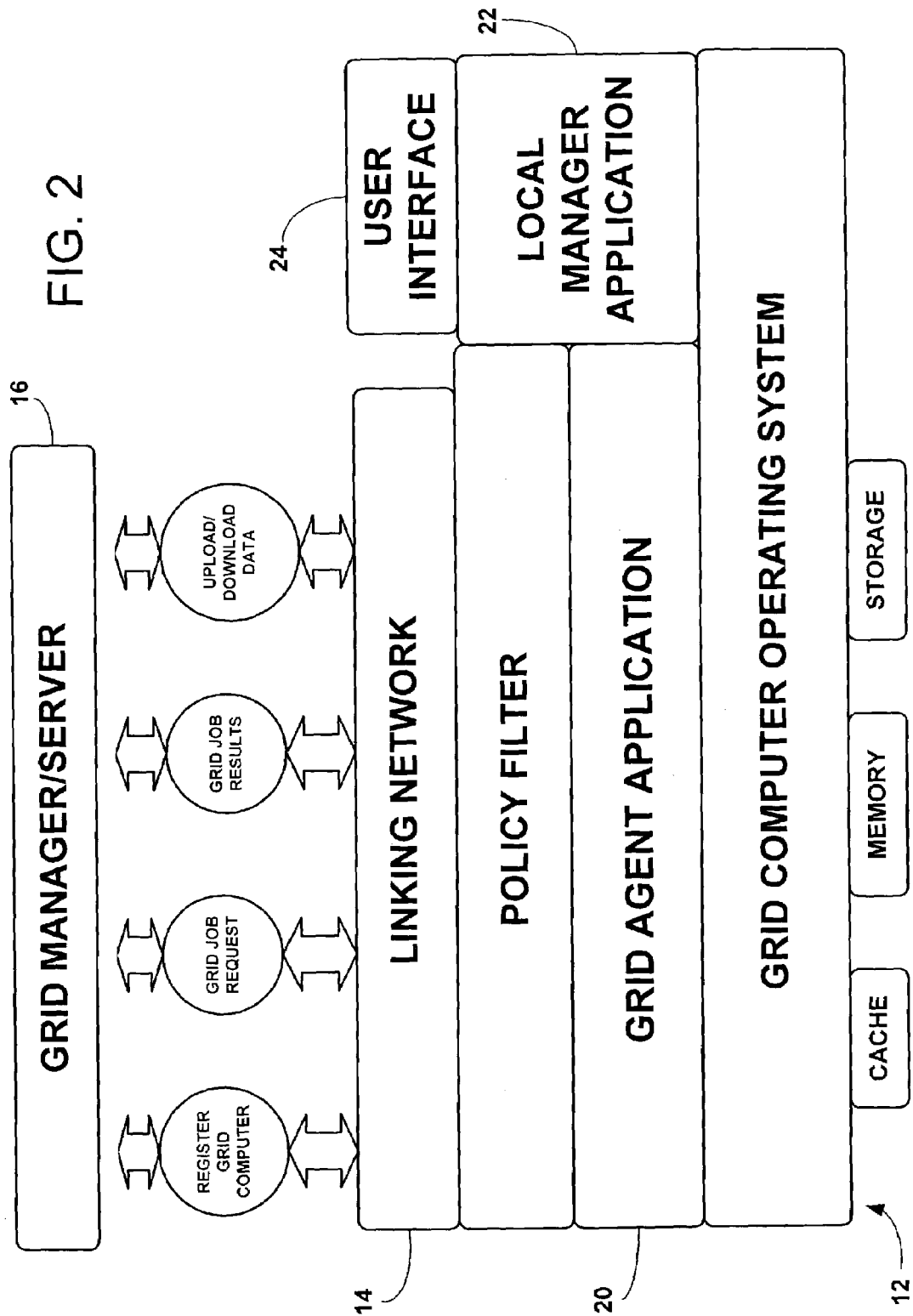
FIG. 2 is a schematic diagram of a conceptual operational relationship between the grid manager of a computing grid and a grid computer of the computing grid.

With reference now to the drawings, and in particular to FIGS. 1 through 6 thereof, a system for restricting use of a grid computer by a computing grid system that embodies the principles and concepts of the present invention will be described.

Initially, for the purposes of clarity in this description, terminology used throughout this description will be defined so as to minimize any confusion with respect to the disclosure of the invention, with the understanding that various other names may be given to the disclosed elements, and this terminology is not intended to be construed as limiting the invention.

A grid system 10 (see FIG. 1) may comprise a plurality of grid computers 12 linked or interconnected together for communication therebetween (such as by a linking network 14), with a grid manager computer 16 designated to administer the grid system. Each of the grid computers 12 may be provided with a grid agent application 20 resident on the grid computer for communicating and interfacing with the grid manager 16 and administering local grid operations on the grid computer (see FIG. 2). In operation, a client computer 18 submits a job to the grid system 10, typically via the grid manager computer 16 which initially receives jobs for processing by the grid system. The client computer 18 may be one of the grid computers 12 on the grid system, or may be otherwise unrelated to the grid system 10. The grid manager 16 may be a computing grid server adapted for accepting jobs from the client computer 18, assigning and communicating the job to one of the grid computers 12, receiving results from the grid computer and communicating the final result back to the client computer. Optionally, the job may be submitted to more than one of the grid computers 12 of the system 10, and in that event the grid manager computer 16 may divide up or apportion the job into more than one subsidiary jobs, or tasks. The grid manager 16 then transmits the tasks to more than one grid computer 12 to be completed, and the results are returned to the grid manager, which correlates the results into a final result, and transmits them to the client computer 18.

In one embodiment of the invention, at least one of the grid computers 12 is located physically or geographically remote from at least one of the other grid computers, and in another embodiment, many or most of the grid computers are located physically or geographically remote from each other. The grid computers 12 and the grid manager computer 16 are linked in a manner suitable for permitting communication therebetween. The communication link between the computers may be a dedicated network, but also may be a public linking network such as the Internet.

Generally, upon implementation on a grid computer 12 of the grid system 10, the invention provides a local user, or operator, or owner (hereinafter collectively referred to as the user) of the grid computer with the ability to set various parameters of use for the grid computer by the computing grid system and the grid jobs performed for the computing grid. The parameters of use may include operational characteristics that control or affect use of components of the grid computer by the grid system for processing grid jobs. The invention may also provide the grid computer user with the ability to set various options for filtering the various transmissions between the grid manager 16 and the grid agent 20 resident on the grid computer.

A local manager application software program 22, or local manager, may implement the invention on the grid computer. In one implementation of the invention, the local manager operates independently of, but in close coordination with, the grid agent application as conceptually depicted in FIG. 2. In another implementation, the local manager may be integrated into the grid agent on the grid computer.

Figure 3:
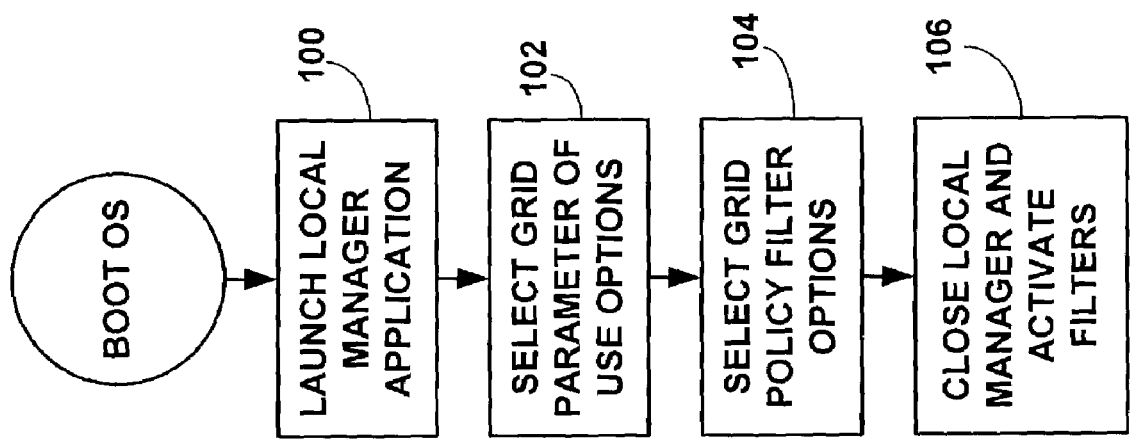
FIG. 3 is a schematic flow diagram of an initializing process of the local manager application.

As generally depicted in FIG. 3, upon the launching of the local manager application on the grid computer (block 100), and optionally at virtually anytime thereafter that the user deems desirable, the user may be presented with a user interface 24 of the local manager 22 that permits the user to select to set or change a number of options for parameters of use for conducting grid system operations on that particular grid computer (block 102). The user may also select to set or change a number of options regarding various policy filtering options to be applied to grid jobs transmitted to the grid computer (block 104). Once the user has selected the desired options for the parameters of use and policy filtering, the user interface of the local manager application may be closed (block 106), and the local manager may thereafter apply the settings to the grid agent 20 and grid jobs sent to the grid agent by the grid manager 16.

Figure 4:
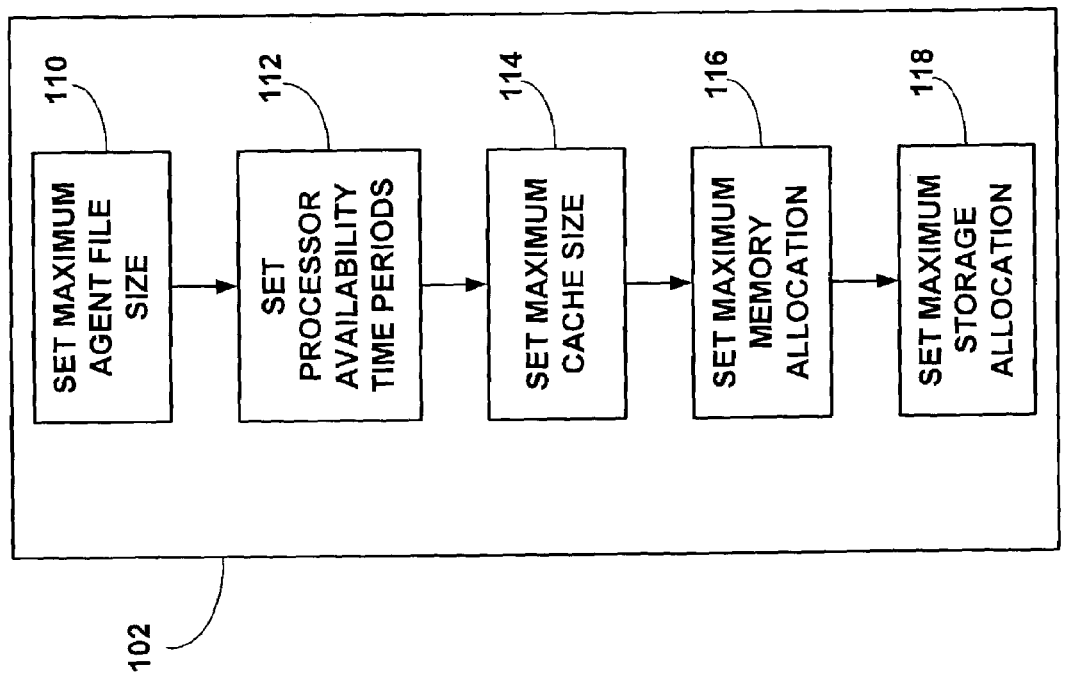
FIG. 4 is a schematic flow diagram of one aspect of the initializing process of the local manager application shown in FIG. 3.
Figure 5:
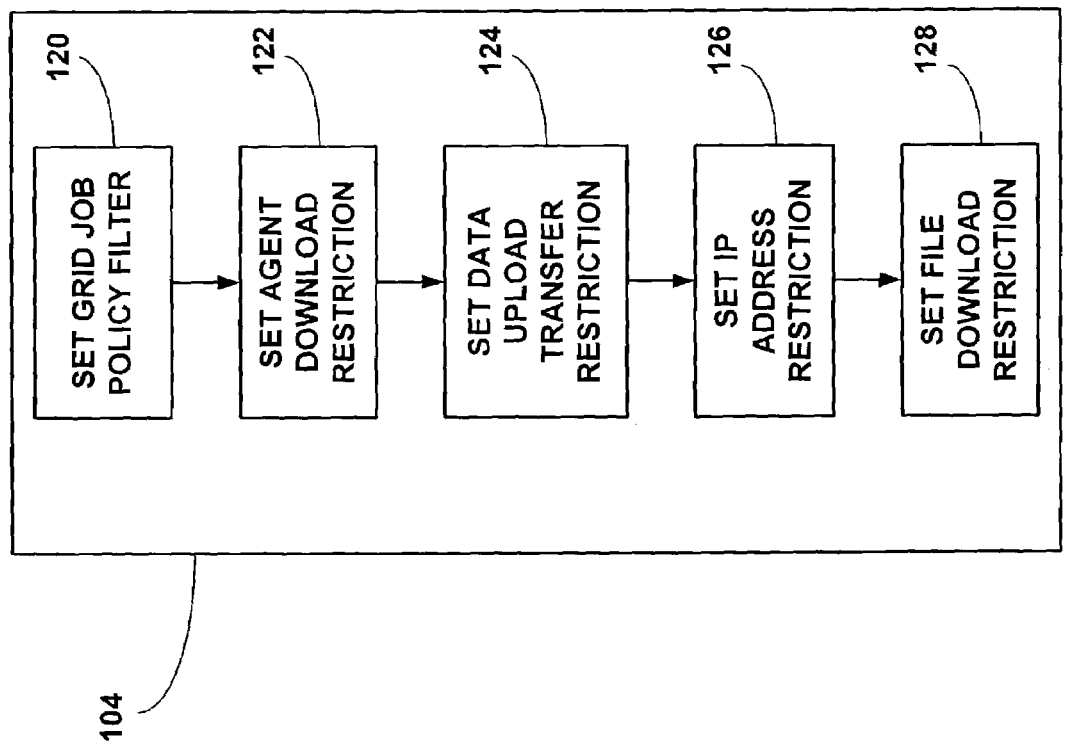
FIG. 5 is a schematic flow diagram of one aspect of the initializing process of the local manager application shown in FIG. 3.
Figure 6:
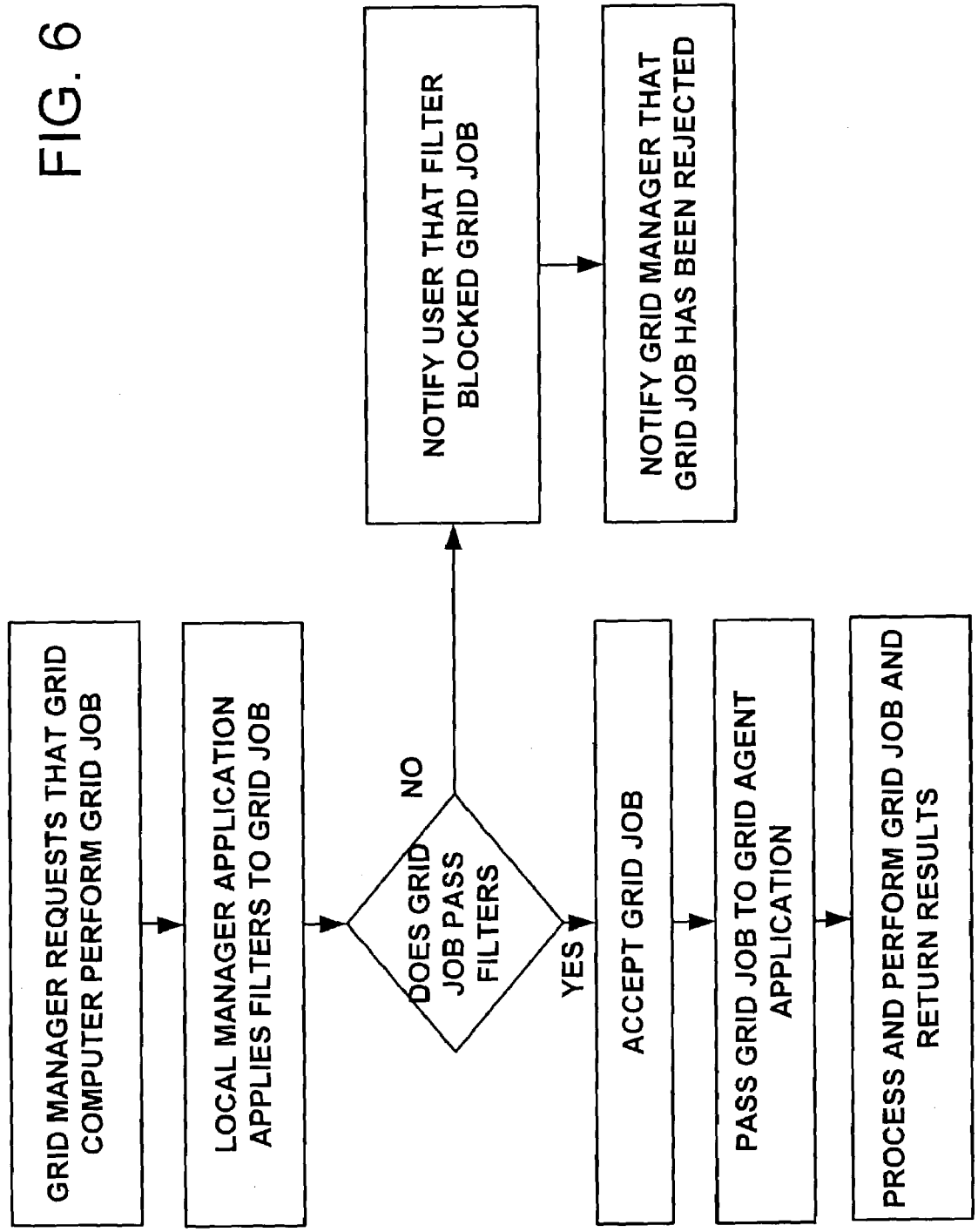
FIG. 6 is a schematic flow diagram of a grid job filtering process of the present invention.

In an implementation of the invention conceptually depicted in FIG. 4, the local manager 22 provides the user of the grid computer with the option to set a parameter of use regarding the size of files created by the agent on the storage medium of the grid computer (block 110). This option permits the user to limit the size of files created by the grid agent 20 on the grid computer. Optionally, the user may choose not to limit the size of the grid system files on the grid computer. Illustratively, the files of the grid system may include data files or program files maintained by the grid agent on the grid computer.

The local manager program 22 may also provide the user with the option of setting parameters of use regarding time periods when the grid computer may be used for grid operations by the grid agent administering local grid operations (block 112). Conversely, this parameter of use may also set time periods when the grid computer may not be used for grid operations. For example, this parameter of use may comprise restrictions on use indicating the particular times of the day or the night that the grid computer may be used (or may not be used), the particular days of the week that the grid computer may be used, or the total number of hours per day (or week or month or other temporal increment) that the grid computer may be used for the purposes of grid operations.

The local manager 22 may further provide the user with the option to set a parameter of use regarding the size of a cache maintained by the agent program in memory or on the storage medium of the grid computer (block 114). The user may set a maximum or upper limit on the amount of the memory or storage space of the grid computer that may be utilized at any one time by the grid agent 22 for the purpose of processing grid jobs for the grid system. The user of the grid computer may thus be able to limit the portion of the random access memory, or storage space on the hard disk drive, of the computer that is dedicated to or utilized by the grid agent for the purposes and operations of the grid system.

The local manager program 22 may also provide, in an implementation of the invention, the user with the option of setting parameters regarding use of memory of the grid computer (block 116). The user may be provided with the option of limiting the amount of the memory of the computer that may be used by the agent when processing tasks for the grid system. The amount of memory usable for grid operations may be limited, for example, in terms of the quantity of memory or the percentage of total memory of the grid computer.

In an implementation of the invention, the local manager 22 may provide the user with the option to set a parameter of use regarding the amount of storage of the grid computer that may be allocated to or utilized by the grid agent for grid operations (block 118). This parameter of use may govern the amount of storage space on any hard disks or other transitory memory on the grid computer.

It should be recognized that all, some, or none of the above parameters of use options for grid operation may be selected by the user or may be implemented in the local manager 22. It should also be appreciated that some of the use options may not be permitted by the grid system, and thus may not be provided to the user by the local manager.

Significantly, the parameter of use options may be adjusted by the user of the grid computer to limit the intrusiveness of grid system operations on the primary functions and operations of the grid computer. The ability to set the parameter of use options to limit the intrusiveness may make participation in the grid system more acceptable to the user, and thereby encourage greater participation by computer users in the grid system. In a preferred implementation of the invention, the parameters of use options are applied and enforced at the grid computer by the local manager 22, although the use parameters may optionally be communicated to the grid manager 16 so that the various use options may be applied to the grid jobs prior to the actual assignment of the grid job to the grid computer.

In another aspect of the invention, the local manager application 22 may also present the user with a number of policy filter options that may be applied to grid jobs and other transmissions between the grid agent and the grid manager. The filter options presented to the user of the grid computer include restrictions directed to the content of the grid jobs that the grid agent is requested by the grid manager to perform on the grid computer.

The local manager 22 may provide the user with the ability to optionally filter or restrict the execution of grid jobs on the grid computer based upon the type or character of the job (block 120). In an implementation of the invention, the limitation on the types of grid jobs may be based upon the type of subject matter that is involved in the job. The user may designate the subject matter of jobs to include, or to permit to pass through the filter to be performed, as well as the subject matter of jobs to exclude, or block from passing through the filter. For example, the user may designate that only jobs having subject matter dealing with medical research be executed on the grid computer. As another example, the user may designate that no job may be executed that is directed to military-related research. As yet another example, the user may designate that only jobs that have a charitable purpose be executed on the grid computer, and conversely no jobs having a profit purpose be executed on the computer.

In an implementation of the invention, the restriction on the types of jobs may be based upon the type of entity or source or grid customer requesting the performance of the job. For example, the user may designate that no jobs from a government entity may be executed on the computer, or that only jobs from government entities may be accepted for execution. As another example, the user may set a policy that no jobs will be accepted from a particular company or entity, or may designate more than one company or entity from which jobs will; not be accepted. As a further example, the user may indicate that jobs from defense contractors may not be accepted.

Depending upon the operating procedure of the grid system, the local manager application, or the grid agent application, may not be capable of or suitable for determining some factors, such as the subject matter of the job or the source of the job, based upon the data that is actually transmitted to the grid agent for a particular job. In such a situation, the filtering function may need to be performed by the grid manager prior to transmitting the job to the grid agent. The local manager may be utilized to receive and record the particular filtering options desired by the user of the grid computer, and may then transmit the filtering options selected by the user to the grid manager so that the filtering can be applied by the grid manager.

The local manager program may also provide the user with the ability to optionally restrict the downloading of a new or updated or otherwise altered grid agent application to the grid computer without notifying the user (block 122). The local manager program may also require that the user provide permission before a new grid agent application is loaded on the grid computer.

The local manager may further provide the user with the ability to optionally restrict the uploading, or transfer, of data or information about the grid computer from the grid agent to the grid system (block 124). The data about the grid computer may be distinguished from the data generated as a result of executing a grid job that has been performed on the grid computer. The data may generally relate to the characteristics of the grid computer, or to the characteristics or behavior of the user, or the activities of the user.

In an implementation of the invention, the local manager 22 may provide the user with the ability to filter or restrict the Internet Protocol (IP) addresses accepted by the grid computer (block 126).

In an implementation of the invention, the local manager 22 may provide the user with the ability to filter or restrict the files being downloaded or sent to the grid computer through the grid agent (block 128). This filtering of files may be distinguished from the files associated with grid jobs submitted to the grid computer for processing, and may include a restriction on the storage of data files on the grid computer for any period of time.

Again, it should be recognized, that all, some, or none of the above filtering options may be implemented in the local manager program, or provided to the user by the local manager program. It will also be appreciated that a grid system, or the grid manager, may restrict user control of grid operations on the grid computer and thus may not permit some of the parameter of use or filtering options set forth above to be exercised by a grid computer on the grid system. In such cases, the filtering options may be performed at the grid manager prior to grid jobs being assigned to the grid computer.

It may be preferable that the filtering options be locally applied to the grid jobs at the grid computer to increase confidence that the policy restrictions are being applied to the grid job assignments and to facilitate periodic adjustment of the options by the user at the user's discretion. The local application of these options to grid job requests provides the user with the ability to reject undesirable grid jobs while minimizing the possibility that the user's use restrictions might be ignored, overridden, or defeated by the grid manager. Further, the local manager application needs only to apply one user's set of desired options, while a grid manager potentially might have to apply the desired options of hundreds or thousands of different users which could possibly lead to errors or omissions in the applications of the restrictions.

In operation, the local manager program may operate in parallel with the grid agent program (see FIG. 6), but also may operate between the linking network 14 for the grid system and the grid agent 20 to apply the desired policy filtering options on the grid job requests being directed to the grid agent. When the policy filter intercepts a grid job that violates one of the user's policies, the local manager may prevent the job request from being passed to the grid agent, or optionally may pass the job to the grid agent with a "do not execute" instruction. The grid manager computer may be informed of the action taken by the local manager so that the grid job may be reassigned to another grid computer on the grid system in a timely fashion.

Optionally, the local manager application may be applied in parallel to a plurality of computers for controlling grid use of the plurality of computers. This may be particularly useful where the plurality of computers share common ownership, common administration, a common user or a common pool of users, or some other commonality that would make it desirable that the plurality of computers operate and interact with the grid system in the same, or a highly similar, manner.

The foregoing is considered as illustrative only of the principles of the invention. Further, since numerous modifications and changes will readily occur to those skilled in the art in view of the disclosure of this application, it is not desired to limit the invention to the exact embodiments, implementations, and operations shown and described. Accordingly, all equivalent relationships to those illustrated in the drawings and described in the specification, including all suitable modifications, are intended to be encompassed by the present invention that fall within the scope of the invention.

I claim:

1. A method of restricting operations of a computing grid performed on a grid computer of the computing grid, comprising:

presenting a user of the grid computer with an option governing use of the grid computer by computing grid operations performed on the grid computer;

accepting from the user a setting of the option governing use of the grid computer;

applying the setting of the option governing use of the grid computer to the computing grid operations performed on the grid computer; and submitting, by the grid computer, a grid job to the computing grid for execution of the grid job by another grid computer, such that the grid computer is also a client computer of the computing grid, wherein presenting the option governing use includes presenting the user with a policy filter option governing use of the grid computer by grid jobs submitted to the grid computer for computing grid operations, wherein the policy filter option comprises a restriction on subject matter of a content of grid jobs that may be performed on the grid computer.

2. The method of claim 1 wherein presenting the option governing use includes presenting the user with a parameter of use option governing use of a component of the grid computer for computing grid operations.

3. The method of claim 2 wherein the parameter of use option comprises a limitation on a size of files created on a storage medium of the grid computer for performing computing grid operations.

4. The method of claim 2 wherein the parameter of use option comprises a limitation on an amount of memory of the grid computer that is usable for performing computing grid operations.

5. The method of claim 2 wherein the parameter of use options comprises a limitation on a time period when the grid computer is usable for performing computing grid operations.

6. The method of claim 2 wherein the parameter of use options comprises a limitation on an amount of storage of the grid computer that is usable for performing computing grid operations.

7. The method of claim 1 wherein the policy filter option comprises a restriction on grid jobs that may be performed on the grid computer based upon an identity of a grid client submitting the grid jobs to the computing grid.

8. The method of claim 1 wherein the policy filter option comprises a restriction on downloading of a grid agent application from the computing grid to the grid computer.

9. The method of claim 1 wherein the policy filter option comprises a restriction on transferring information about the grid computer to the computing grid.

10. The method of claim 1 wherein the policy filter option comprises a restriction of downloading files to the grid computer by the computing grid.

11. The method of claim 1 wherein applying the setting of the option governing use comprises applying the setting to all grid jobs submitted to the grid computer.

12. The method of claim 1 wherein the presenting, accepting, and applying steps are conducted by a local manager application resident on the grid computer.

13. The method of claim 1 wherein the user from which the setting of the option is accepted is an owner of the grid computer on which the setting of the option governing use for computer grid operations is applied.

14. The method of claim 1 wherein the setting of the option governing use is applied on the same grid computer on which the setting of the option was presented and accepted.

15. The method of claim 1 wherein the presenting step, the accepting step, and the applying step are all performed on the same grid computer subject to the setting of the option governing use.

16. The method of claim 1 wherein the presenting step, the accepting step, and the applying step are all performed on only one of the grid computers of the computing grid.

17. A method of restricting operations of a computing grid performed on a grid computer of the computing grid, comprising:
  presenting a user of the grid computer with an option governing use of the grid computer by computing grid operations performed on the grid computer;
  accepting from the user a setting of the option governing use of the grid computer; and
  applying the setting of the option governing use of the grid computer to the computing grid operations performed on the grid computer,
  wherein presenting the option governing use includes presenting the user with a parameter of use option governing use of a component of the grid computer for computing grid operations,
  wherein the parameter of use option comprises a limitation on a size of a cache on the grid computer for performing computing grid operations, and
  wherein presenting the option governing use further includes presenting the user with a policy filter option governing use of the grid computer by grid jobs submitted to the grid computer for computing grid operations, wherein the policy filter option comprises a restriction on subject matter of a content of grid jobs that may be performed on the grid computer.

18. A method of restricting operations of a computing grid performed on a grid computer of the computing grid, the method comprising:
  presenting a user of the grid computer with an option governing use of the grid computer by computing grid operations performed on the grid computer;
  accepting from the user a setting of the option governing use of the grid computer;
  applying the setting of the option governing use of the grid computer to the computing grid operations performed on the grid computer;
  submitting, by the grid computer, a grid job to the computing grid for execution of the grid job by another grid computer, such that the grid computer is also a client computer of the computing grid;
  wherein the user is a local user of the grid computer on which the setting of the option is applied,
  wherein presenting the option governing use includes presenting the user with a parameter of use option governing use of a component of the grid computer for computing grid operations,
  wherein the parameter of use option comprises a limitation on a size of a cache on the grid computer for performing computing grid operations, and
  wherein presenting the option governing use includes presenting the user with a policy filter option governing use of the grid computer by grid jobs submitted to the grid computer for computing grid operations, wherein the policy filter option comprises a restriction on subject matter of a content of grid jobs that may be performed on the grid computer.

19. The method of claim 18 wherein the parameter of use option comprises a limitation on a size of files created on a storage medium of the grid computer for performing computing grid operations.

20. The method of claim 18 wherein the parameter of use option comprises a limitation on an amount of memory of the grid computer that is usable for performing computing grid operations.

21. The method of claim 18 wherein the parameter of use option comprises a limitation on a time period when the grid computer is usable for performing computing grid operations.

22. The method of claim 18 wherein the policy filter option comprises a restriction on grid jobs that may be performed on the grid computer based upon an identity of a grid client submitting the grid job on the computing grid.

23. The method of claim 18 wherein the policy filter option comprises a restriction on transferring information about the grid computer to the computing grid.

* * * * *